Sept. 4, 1934.                K. HÄHNEL                1,972,420
              CONTROL DEVICE FOR A HEAT TRANSFER SYSTEM
                         Filed July 18, 1932
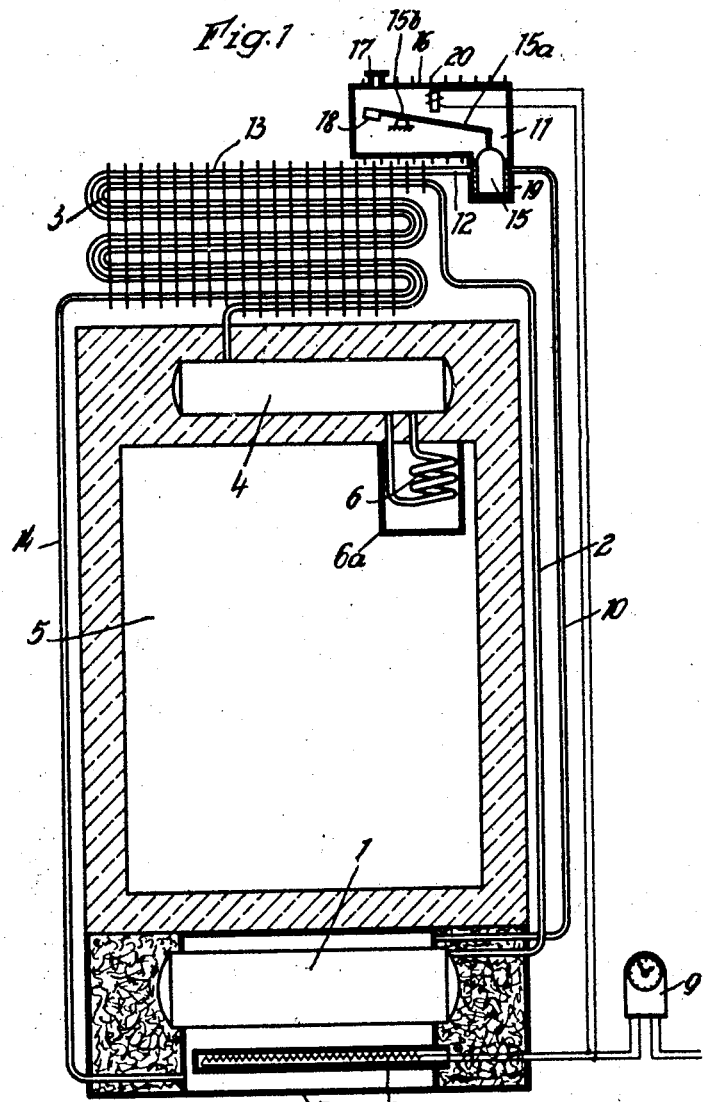
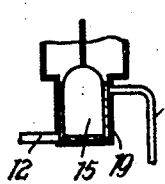
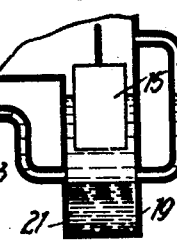
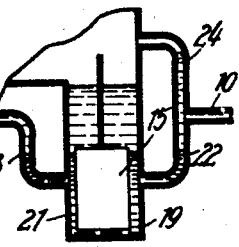
Inventor
Kurt Hähnel
by Knight Bro.
         attorney Patented Sept. 4, 1934

1,972,420

UNITED STATES PATENT OFFICE 1,972,420

CONTROL DEVICE FOR A HEAT TRANSFER SYSTEM

Kurt Hähnel, Berlin-Siemensstadt, Germany, assignor to Siemens-Schuckertwerke Aktiengesellschaft, Berlin-Siemensstadt, Germany, a corporation of Germany Application July 18, 1932, Serial No. 623,257
In Germany July 29, 1931

14 Claims. (Cl. 62—5)

My invention relates to a control device for a heat transfer system, and more particularly to a device for controlling the circulation of an auxiliary medium within a system of the above character in which the auxiliary medium is caused to circulate so as to indirectly heat and cool the generator-absorber of a periodic absorption refrigerating apparatus.

It is known in the art to employ a circulating medium for the transfer of heat between two portions of a system, the auxiliary medium being automatically maintained in circulation by alternate heating of the circulating medium at one portion of the system in which higher temperatures prevail and cooling at another portion of the system in which lower temperatures prevail. Such systems for the transfer of heat are both for heating purposes and for cooling devices well known. In order to interrupt the circulation of the auxiliary medium in such a system for the transfer of heat it has hitherto been customary to employ valves.

The object of my invention is to provide a device for controlling the circulation of a liquid in a system in which no valves are necessary. According to the invention the system is provided at one point with an overflow and the liquid level at the overflow may be raised or lowered depending upon the forces generated within the system so as to cause the circulation of the liquid to be initiated or interrupted.

The invention may, for instance, be carried out by inserting in the circulating system a receptacle in which the level of the circulating liquid is varied by a level-responsive device. The receptacle in which the plunger operates is preferably situated at the highest point of the system, and is so designed that the circulation is initiated upon the immersion of the plunger in the receptacle of liquid and interrupted upon the upward movement of the same.

Such a device is applicable to systems for the transfer of heat of any kind. This device particularly lends itself to a system for the circulation of a cooling medium, which serves to carry off the heat of absorption from the heat radiating parts of the generator-absorber of a periodic absorption refrigerating apparatus.

The accompanying drawing represents some embodiment in a diagrammatic form of a device for controlling the circulation of an auxiliary liquid in a periodic absorption refrigerating apparatus.

In the drawing:

Fig. 1 is a diagrammatic representation of a refrigerating system having a control device adapted to initiate and interrupt the circulation of an auxiliary liquid.

Fig. 2 represents a modified form of the device shown in Fig. 1.

Figs. 3 and 4 show a further modified form of the control device in which a sealing liquid is utilized to interrupt the circulation of an auxiliary liquid in the circulating system.

Referring to Fig. 1, the reference character 1 denotes a generator-absorber containing a solid absorbing medium consisting, for instance, of calcium chloride saturated with ammonia. During the heating period the ammonia is driven out of the solution and passes upwardly as a vapor through the conduit 2 into an air-cooled condenser 3, where it is condensed to a liquid. The liquefied ammonia reaches a collecting vessel 4 communicating with an evaporator coil 6 which projects into the cooling chamber 5, the coil 6 being enclosed in a container 6a filled with a salt solution. The generator-absorber is surrounded by a cooling jacket 7 in which is located a heating element 8, connected in the usual manner to a supply circuit through a contact making clock 9. From the upper part of the cooling jacket 7 a conduit 10 extends to a receptacle 19 in open communication with an expansion vessel 11. A conduit 12 extends from the receptacle 19 to an air-cooled return cooler 13. The other end of the return cooler communicates with the lower part of the cooling jacket 7 through a conduit 14. During the absorption period the system is filled to a marked level with a cooling liquid, the boiling point of which is higher than the highest temperature that may be expected during the generating period. The heat of absorption is transferred from the generator-absorber 1 to the cooler 13 by the automatic circulation of the auxiliary cooling medium and thence carried off to outside atmosphere. A plunger 15 is disposed in the receptacle 19 integral with the expansion vessel 11 provided with radiating fins 20.

During the absorption period the plunger is immersed in the receptacle 19. The receptacle 19 has preferably a circular cross-section, so that the annular space formed by the walls of the receptacle 19 and by the plunger 15 is filled up with the liquid to a level as shown in Fig. 1. The entire system for the circulation of the cooling medium is sealed off from outside atmosphere. On the top of the expansion vessel 11 an inlet connection 17 is arranged which, if desired, may be designed as a safety valve. In order to prevent a possible decomposition of the cooling medium, the expansion vessel 11 may be filled with an inert gas. The plunger is actuated by an electromagnet 16 through a lever 15a pivotally mounted on a stationary support 15b and carrying at one end a counter-weight 18 to support the upward movement of the plunger 15, the electromagnet 16 being energized throughout the heating period.

The plunger 15 must be somewhat heavier than the displaced liquid and may, therefore, be designed as a hollow body. As the entire actuating mechanism of the plunger 15 is disposed within the closed system no pressure variations will occur within the system upon the upward movement of the body 15.

As soon as the plunger 15 at the beginning of the heating period is drawn by the electromagnet into the gas space of the expansion vessel 11, the circulation of the cooling liquid will be interrupted, since the liquid in the above-mentioned annular space will now fill up the cylindrical space set free by the plunger 15 upon its upward movement. In order to attain the highest possible level of the liquid with the plunger immersed in the receptacle 19, the ratio of the area of the plunger 15 to the area of the cylindrical receptacle 19 must be as great as possible.

The cylindrical space set free by the upward movement of the plunger 15 must be so large as to be capable of taking up first the volume of the above-mentioned annular space and then the surplus in liquid flowing to the receptacle 19 as a result of the heating. If the conduits 10 and 12 enter the receptacle 19 at the same height as shown in Fig. 1, the space of the cooling jacket above the heating element, besides the above-named space requirements, must be so designed as to be equal in volume to the space between the level of liquid in the receptacle 19 and the height at which the conduits enter the receptacle, so that in the case of an undue rise in temperature in the jacket 7 the circulation may be initiated by the evaporation in the cooling jacket 7 and condensation in the cooler 13, which condensation is supported by the cooling fins 20 of the expansion vessel 11. The heating element 8 remains always surrounded by the liquid and is, therefore, not exposed to any danger.

Instead of having the conduits enter the receptacle 19 at the same height, the conduits 10 and 12 may enter the receptacle 19 at different heights, as shown in Fig. 2. In this case the circulation is readily initiated in the event of an overheating of the generator-absorber 1. This embodiment is particularly advantageous and desirable in order to attain a different level of the liquid in both portions of the conduits 10 and 12. As the rising portion 10 becomes very hot, while the conduit 12 remains relatively cool the specific gravities in both portions of the conduits will differ greatly from each other. The greatest possible difference in the specific gravity during the heating is desirable in order to attain during the absorption period a most effective circulation of the cooling medium.

The circulation of the cooling liquid may, however, also be interrupted by immersing the plunger 15 in the receptacle 19, instead of by an upward movement of the plunger 15. To this end, a sealing liquid is utilized which is heavier than the cooling liquid.

In Figs. 3 and 4, 21 denotes the sealing liquid which is forced upon the downward movement of the plunger 15 into the conduits 22 and 23 and thus interrupts the circulation of the cooling liquid. 24 is a pressure compensating pipe which connects the conduit 22 to the vapor space of the expansion vessel 11 and serves at the same time as a safety pipe, in case the temperature in the generator cooling jacket rises above the normal operating temperature.

The invention is applicable both to closed systems and to systems communicating with outside atmosphere. The heating of the generator-absorber may be directly effected. In this case the system acts during the absorption period as a cooling system and as a safety means against overpressures set up during the heating period.

I claim as my invention:

1. A heat transfer system of the class described including a circulating medium, an overflow in said system adapted to receive said medium, fluid displacement means arranged to coact with the medium in said overflow to control the circulation of said medium in said system, and means to automatically operate said displacement means to permit circulation or effect discontinuance of the same.

2. A heat transfer system in which an auxiliary fluid medium is maintained in circulation by alternate heating and cooling periods, an overflow in said system adapted to receive a quantity of said fluid medium, fluid displacement means in said overflow for controlling the circulation of said medium in said system, and means automatically operative incident to initiation of one of the periods aforesaid for actuating said displacement means to thereby control the circulation of the fluid medium.

3. In a heat transfer system in which an auxiliary medium is maintained in circulation by alternate heating and cooling, an overflow located at one point of said system, means for varying the height of the liquid level at said overflow and for permitting the circulation of said auxiliary medium to be initiated upon a movement in one direction and causing it to be interrupted upon a movement of said means in the other direction.

4. In a heat transfer system in which an auxiliary medium is maintained in circulation by alternate heating and cooling, a receptacle inserted in said circulating system, an overflow communicating with said receptacle, means operating in said receptacle for permitting the circulation of the auxiliary medium to be initiated upon a movement in one direction and causing it to be interrupted upon a movement of said means in the other direction.

5. An absorption refrigerating apparatus of the intermittent type comprising a generator-absorber, a condenser, an evaporator, means for transmitting the refrigerant from the generator-absorber to the evaporator and vice versa, means for heating the generator, a generator-absorber cooling system containing a liquid and including a part in heat exchange relation with the generator-absorber, a cooler, connections between said part and said cooler, an overflow disposed at one point of said cooling system, means for varying the height of the liquid level at said overflow and for permitting the circulation of said auxiliary medium to be initiated upon a movement in one direction and causing it to be interrupted upon a movement of said means in the other direction.

6. In a heat transfer system in which an auxiliary medium is maintained in circulation by alternate heating and cooling, a receptacle inserted in the circulating system at the highest point thereof, an overflow communicating with said receptacle, and a plunger operating in the receptacle so as to permit the circulation of the auxiliary medium to be initiated upon the downward movement and cause it to be interrupted upon the upward movement of said plunger.

7. In a heat transfer system in which an auxiliary medium is maintained in circulation by alternate heating and cooling, a receptacle inserted in the circulating system at the highest point thereof, an overflow communicating with said receptacle, a sealing liquid contained in said receptacle and having a heavier specific weight than the circulating liquid and means operating in said receptacle so as to permit the circulation of the auxiliary liquid to be initiated upon the upward movement and cause it to be interrupted upon the downward movement of said means.

8. In a heat transfer system in which an auxiliary medium is maintained in circulation by alternate heating and cooling, an expansion vessel associated with said circulating system, an overflow communicating with said vessel, means operating in said expansion vessel so as to permit the circulation of the auxiliary medium to be initiated upon the movement in one direction and cause it to be interrupted upon the movement of said means in the other direction.

9. An absorption refrigerating apparatus of the intermittent type comprising a generator-absorber, a condenser, an evaporator, means for transmitting the refrigerant from the generator-absorber to the evaporator and vice versa, means for heating the generator, a generator-absorber cooling system containing a liquid and including a jacket in heat exchange relation with the generator-absorber, an overflow located at one point of said system, a cooler, connections between said jacket and said cooler, a plunger adapted to vary the height of the liquid level at said overflow and to permit the circulation of the auxiliary medium to be initiated upon the downward movement and cause it to be interrupted upon the upward movement of said plunger, an expansion vessel associated with said cooling system, a conduit connecting the jacket of the generator-absorber to said vessel, a second conduit connecting said vessel to the cooler and leaving the vessel at the same height at which the first-named conduit enters the vessel.

10. An absorption refrigerating apparatus of the intermittent type comprising a generator-absorber, a condenser, an evaporator, means for transmitting the refrigerant from the generator-absorber to the evaporator and vice versa, means for heating the generator, a generator-absorber cooling system containing a liquid and including a jacket in heat exchange relation with the generator-absorber, an overflow located at one point of said system, a cooler, connections between said jacket and said cooler, a plunger adapted to vary the height of the liquid level at said overflow and to permit the circulation of the auxiliary medium to be initiated upon the downward movement and cause it to be interrupted upon the upward movement of said plunger, an expansion vessel associated with said cooling system, a conduit connecting the jacket of the generator-absorber to said vessel, a second conduit connecting said vessel to the cooler and leaving the vessel at the same height at which the first-named conduit enters the vessel, the space of the cooling jacket of the generator-absorber above the heating element being so dimensioned as to be equal in volume to the space left between the level of the liquid in the receptacle and the height at which the conduits enter the receptacle after removal of the plunger.

11. An absorption refrigerating apparatus of the intermittent type comprising a generator-absorber, a condenser, an evaporator, means for transmitting the refrigerant from the generator-absorber to the evaporator and vice versa, means for heating the generator, a generator-absorber cooling system containing a liquid and including a jacket in heat exchange relation with the generator-absorber, an overflow located at one point of said system, a cooler, connections between said jacket and said cooler, a plunger adapted to vary the height of the liquid level at said overflow and to permit the circulation of the auxiliary medium to be initiated upon the downward movement and cause it to be interrupted upon the upward movement of said plunger, an expansion vessel associated with said cooling system, a conduit connecting the jacket of the generator-absorber to said vessel, a second conduit connecting said vessel to the cooler and leaving the vessel at a point below that at which the first-named conduit enters the vessel.

12. In a heat transfer system in which an auxiliary medium is maintained in circulation by alternate heating and cooling, an expansion vessel associated with said circulating system, an overflow communicating with said vessel, a plunger operating in said vessel so as to permit the circulation of the auxiliary medium to be initiated upon a movement in one direction and cause it to be interrupted upon a movement of said plunger in the other direction, a supply conduit and a discharge conduit connected to said vessel, said vessel being so dimensioned and the conduits so arranged that with the plunger displaced from the vessel the cooling medium flowing upwardly as a result of the heating is collected in the expansion vessel without being able to continue the circulation in the conduit leaving said vessel.

13. An absorption refrigerating apparatus of the intermittent type comprising a generator-absorber, a condenser, an evaporator, means for transmitting the refrigerant from the generator-absorber to the evaporator and vice versa, means for heating the generator, a generator-absorber cooling system containing a liquid and including a part in heat exchange relation with the generator-absorber, a cooler, connections between said part and said cooler, an overflow disposed at one point of said cooling system, a plunger for varying the height of the liquid level at said overflow so as to permit the circulation of the liquid to be initiated upon a movement of said plunger in one direction and cause it to be interrupted upon movement in the other direction, and an electromagnet for operating said plunger.

14. In a heat transfer system in which an auxiliary medium is maintained in circulation by alternate heating and cooling, an expansion vessel containing an inert gas and associated with said circulating system, an overflow communicating with said vessel, a plunger operating in said expansion vessel so as to permit the circulation of the auxiliary medium to be initiated upon the movement in one direction and cause it to be interrupted upon the movement of said plunger in the other direction, and means disposed in said vessel for adjusting the plunger.

KURT HÄHNEL.